June 25, 1963     H. LUCK     3,094,805
BAIT STATION FOR RODENTS
Filed March 30, 1960

INVENTOR.
HARRY LUCK
BY
Wheeler, Wheeler & Wheeler
ATTORNEYS

United States Patent Office 3,094,805
Patented June 25, 1963

3,094,805
BAIT STATION FOR RODENTS
Harry Luck, 3145 N. Argonne Drive, Milwaukee, Wis.
Filed Mar. 30, 1960, Ser. No. 18,685
7 Claims. (Cl. 43—131)

This invention relates to a bait station for rodents.

An important object of the invention is to provide a bait station to which rodents are attracted, even in the presence of acceptable food outside the bait station. Rodents are very selective. Where palatable food is otherwise available, they will avoid conventional baits and rodenticides in favor of the otherwise available palatable food. The bait station of the present invention, however, is so attractive to the rodent that the rodent will prefer the bait station of the present invention to otherwise freely available palatable food.

The bait station of the present invention achieves its success primarily because of the way in which the rodenticide is packaged. The bait station consists essentially of an outer package containing therewithin a plurality of individually wrapped inner packages of rodenticide. The outer package has an opening through which the rodents have access to the inner packages which are sufficiently small and lightweight so that the rodent can carry the individual packages to its lair for consumption on its home premises. The outer package, or a cover therefor, desirably has a throat between the opening thereto and the individual packages to provide a shelter into which the rodent can crawl while feeding upon the bait or taking the bait packages in its mouth for the purpose of transporting the packages to its lair.

Prior art attempts to administer rodenticides and in which the rodenticide is transferred from the container in which is is purchased to small tins, ceramic vessels, or dishes, etc., from which the rodent is expected to feed, have not been particularly successful, especially in any environment in which other palatable food is available to the rodent. As aforestated, rodents are very selective in their eating habits and will reject any food in tin cans, dishes, etc., if there is other food available. Accordingly, an object of the bait station of the present invention is to avoid any use of tin cans, dishes, etc., and to administer the rodenticide to the rodent in a bag of paper, cloth, cellophane, plastic, etc., of the type in which the rodent ordinarily expects to find other palatable food such as cereal grain, dog food, etc.

Moreover, rodents by nature have a compulsion to carry objects to their lairs and to hoard such objects. In one sense, rodents are born thieves. Accordingly, it is an important feature of the bait station of the present invention that the rodenticide is packaged in small size lightweight individual packages which the rodent may carry in its mouth or drag to its lair intact. Once the package has been carried to its lair, the rodent can open it at its leisure and feed itself and its young therefrom in its own nest in familiar surroundings.

Another important feature of the present invention is the structure of the bait station in which the rodent is sheltered while it is either feeding directly from the individual bait packages or manipulating the packages for the purpose of carryng them off to its lair. Rodents do not like to feed in the open. They much prefer to feed and run in dark confined places where they have a sense of security.

Another advantage of the present invention is the individual packaging of each "carry home" dose of rodenticide. Accordingly, the rodenticide packages which are not removed immediately from the bait station will remain substantially continually fresh over a relatively long period of time without decomposing or becoming moldy. Prior art rodenticides which are administered in open tin cans, etc., decompose rapidly and quickly lose their freshness. Such rodenticides are unappetizing to the rodent and are rejected by the rodent in favor of any other available palatable food. Rodenticide packaged according to the present invention, however, will last almost indefinitely, even after the outer package is opened. I have determined experimentally that rodenticide packaged according to the present invention is still fresh, palatable and attractive to the rodent even after one year of storage.

Another feature and advantage of the present invention is the sanitary aspects of the bait station with respect to the humans which must handle it. Inasmuch as the rodenticide is packaged for sale to humans in the same bait station which is used to bait the rodent, it is unnecessary for any human to handle vessels or containers on which rodents have previously deposited germs in the course of eating therefrom. The rodent carries away to its lair the individual packages of rodenticide and the outer container is disposable and is not reused.

Another important feature of the present invention is the incorporation in the rodenticide of an aromatic attractor to which the rodents are particularly subject. Rodents have a very highly developed sense of smell and prefer my rodenticide over other palatable foods which may freely be available.

Other advantages, objects and features of the invention will appear from the following disclosure in which.

Figure 1:
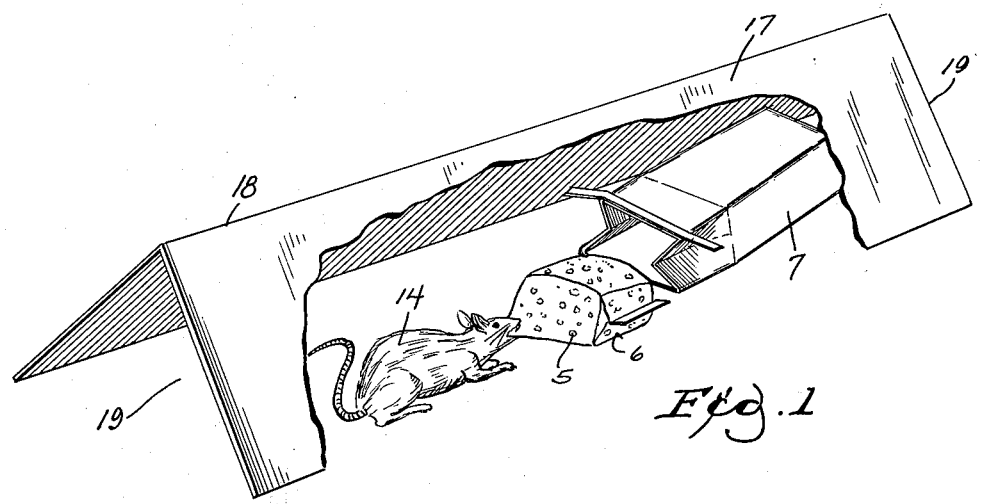
FIG. 1 is a diagrammatic perspective view of one embodiment of bait station, an external cover for the package being broken away to expose the package within the cover.

In a broad sense the invention is not limited to any specific rodenticide. The invention is primarily in the packaging of the rodenticide and in the bait station in which the rodenticide is administered to the rodent. In commercal embodiments of the invention, I prefer to use "Warfarin" as the active poisonous ingredient of my rodenticide. "Warfarin" is described in detail in United States Patent 2,427,578. Its brief technical description is:

3-(a-acetonyl benzyl) 4-hydroxycourmarin

In the commercial embodiments of the invention, the "Warfarin" amounts to .025% of the total, the remaining 99.975% constituting bait and food ingredients such as mixed cereal grains and other feed which is attractive to the rodent. As aforestated, I also include an aromatic attractor. Several such attractants are suitable. I prefer to use a stabilized animal or vegetable fat such as hydrogenated peanut oil, mineral oil, corn oil, or animal or vegetable byproducts such as cheese, molasses, horse meat, etc. Aniseed can also be used because of its powerful odor which attracts rodents.

The ingredients aforesaid are desirably pelletized as indicated by reference character 5 in the drawings and are packaged in individual cellophane bags 6, each of which desirably weighs about 4 ounces, thus to be easily carried by large rodents such as rats. The cellophane bag retards transfer of oxygen from the atmosphere into the package, thus to retard decomposition of the contents thereof. The stabilization of the bag ingredients also retards decomposition and contributes toward continued freshness. Accordingly, large quantities of the bait may be purchased without fear of loss due to rapid spoilage. The odor of the aromatic attractant within the bag 6, however, is released slowly through the cellophane wall which is somewhat pervious to the odor.

In practice I package four of the 4 ounce packages 6 in a one pound multi-ply outer bag 7, which desirably comprises a paper outer ply 8 and a plastic, waxpaper or glassine inner ply 9. The outer bag or package 7 has a conventional fold-over type closure flap 10 secured by the bendable locking tabs 11.

The rodenticide is transported and sold to the public in the package 7, which comprises the bait station when the package is used to administer the rodenticide to rodents.

Figure 2:
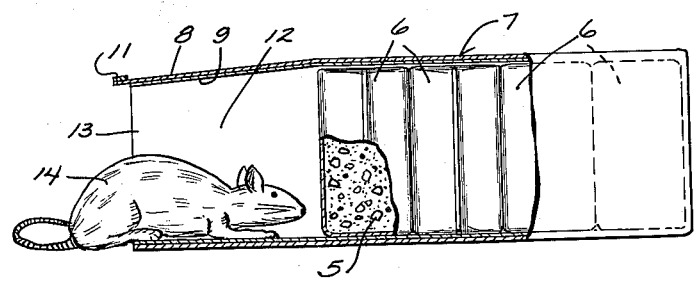
FIG. 2 is a cross section through the outer package within which the individual packages of rodenticide are encased, a rodent being diagrammatically shown in the course of entering the package.
Figure 3:
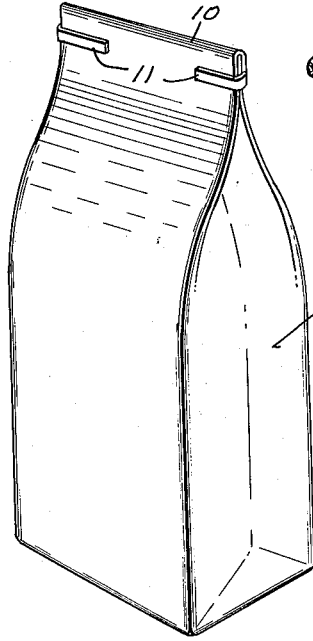
FIG. 3 is a perspective view of the package in the condition thereof in which it is sold to the public.

In use the package may simply be laid on its side, as shown in FIG. 2, after the flap 10 and locking tabs 11 have been opened. When thus opened, there is a throat 12 between the bag end opening 13 and the first individual package 6. This throat constitutes a shelter into which a rodent, diagrammatically indicated at 14 in FIG. 2, can crawl entirely, or at least insert his head, depending upon rodent size, either to tear open package 6 and feed directly therefrom or to pick up the package in its mouth and carry it off to its lair.

The bait station is desirably placed in a relatively dark sheltered part of the building so that the rodent will not hesitate to enter the bait station and will feel relatively secure therein.

FIG. 1 illustrates the additional use of a cover 17 which may be placed over the package 7 so that the rodent 14 will be completely housed and sheltered beneath cover 17 while feeding from or manipulating the individual bait package 6. The cover 17 is desirably nonmetallic and may consist simply of a wooden board laid diagonally against a side wall of the building. It may consist of a length of cardboard bent along a medial line 18 and erected over the package 7, as indicated in FIG. 1. The openings 19 at the ends of the cover 17 should not be large enough for large animals or pets to get into the bait station. These should not be more than about 2½ inches wide.

Typical sites for installation of bait stations according to the present invention are dog kennels, grain warehouses, cattle barns, etc. In all of these locations there is usually abundant palatable food for the rodents, hence the importance of providing a rodenticide which is more attractive to the rodent than the otherwise available food.

My novel method of baiting rodents can be summerized as follows:

First, I package a plurality of individual small-size bait-filled containers in a larger container. The larger container is laid on its side with an end open to provide a sheltered entry for the rodent into the larger container. The method desirably includes releasing into the atmosphere through the individual containers the aroma of an aromatic rodent attractant. I may optionally erect a cover over the bait station to provide a large shelter for the rodent. In my method the package 7 itself is the bait station. It is desirably hidden so that feeding is not in the open.

I claim:

1. A method of baiting rodents comprising the steps of packaging a plurality of individual small-size rodent portable bait containers in a larger container, opening said larger container through a side thereof to provide a sheltered entry for the rodent into the larger container and from which the rodent may carry off said portable bait containers.

2. The method of claim 1 plus the step of releasing into the atmosphere through said individual bait containers the aroma of an aromatic rodent attractant.

3. A rodenticide package adapted for sanitary handling by humans and comprising a plurality of individually wrapped inner packages of rodenticide, the walls of said packages retarding passage of oxygen therethrough to maintain freshness of the rodenticide therein but being pervious to the odor of aromatic ingredients of the rodenticide to attract rodents thereto, an outer package encased about said plurality of individually wrapped inner packages, said outer package having an opening through which rodents have access to the inner packages for removal of said inner packages individually, said individual inner packages being rodent portable for transport by the rodent individually to its lair.

4. The package of claim 3 in which said outer package has a throat between said opening and said individually wrapped inner packages to constitute a shelter into which said rodent can crawl.

5. The package of claim 3 in combination with a cover over said outer package to constitute a rodent shelter.

6. A rodent bait station comprising an outer package and a plurality of individually wrapped rodent portable inner packages of rodenticide, said outer package having an opening through which rodents have access to the inner packages and through which the rodents may carry away the portable inner packages.

7. The bait station of claim 6 in which the inner package contains an aromatic attractant, said inner packages being pervious to the aroma of said attractant.

References Cited in the file of this patent
UNITED STATES PATENTS

| | | |
|---|---|---|
| 1,113,842 | Sill | Oct. 13, 1914 |
| 1,858,159 | Laymon | May 10, 1932 |
| 1,962,900 | Hirsch | June 12, 1934 |
| 2,716,305 | Schutte | Aug. 30, 1955 |
| 2,770,067 | Lindblom | Nov. 13, 1956 |
| 2,921,401 | Kawamura | Jan. 19, 1960 |